United States Patent
Gonda

[11] 3,744,914
[45] July 10, 1973

[54] AUTOMATIC POSITIONING DEVICE
[75] Inventor: Tsunemi Gonda, Tokyo, Japan
[73] Assignee: Nippon Kogaku K.K., Tokyo, Japan
[22] Filed: Dec. 6, 1971
[21] Appl. No.: 204,813

[30] Foreign Application Priority Data
Dec. 4, 1970 Japan.............................. 45/106768
Dec. 4, 1970 Japan.............................. 45/106769

[52] U.S. Cl.............. 356/152, 356/172, 250/203 R, 250/233
[51] Int. Cl. .......................................... G01b 11/26
[58] Field of Search.................... 356/141, 152, 172; 250/203, 231 SE, 233

[56] References Cited
UNITED STATES PATENTS
3,348,050  10/1967  Bez..................................... 250/233
3,356,849  12/1967  Whitney.......................... 250/203 R Primary Examiner—Benjamin A. Borchelt
Assistant Examiner—S. C. Buczinski
Attorney—Joseph M. Fitzpatrick, John Thomas Cella et al.

[57] ABSTRACT

An automatic positioning device for automatically positioning an object in a plane comprises a light source for illuminating a member formed with an opening through which light from the light source may pass, scanning means having a chart of a predetermined period and moved at a predetermined speed, and an optical system for focusing the light passed through the opening so as to form an image of the opening on the chart. The chart is adapted to scan the image of the opening when the scanning means is moved, thus providing a light control signal of the same period as that of the chart. The light control signal is received by a photoelectric element, which converts the light control signal into an electrical control signal. Reference signal generating means is provided to generate an electrical reference signal which is synchronous with and of the same period as the electrical control signal. The electrical control signal and the electrical reference signal are applied to phase difference measuring means, which measures the phase difference between these electrical signals. Drive means is provided which is operable in response to an output signal from the phase difference measuring means to move the member formed with the opening relatively to said optical system in a direction perpendicular to the optical axis of the optical system so that the difference between the electrical control and reference signals attains a predetermined level.

10 Claims, 48 Drawing Figures

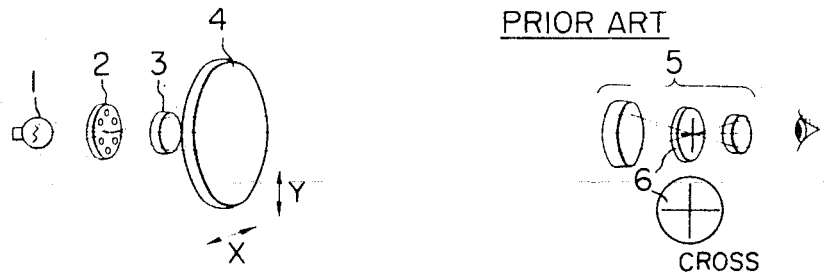
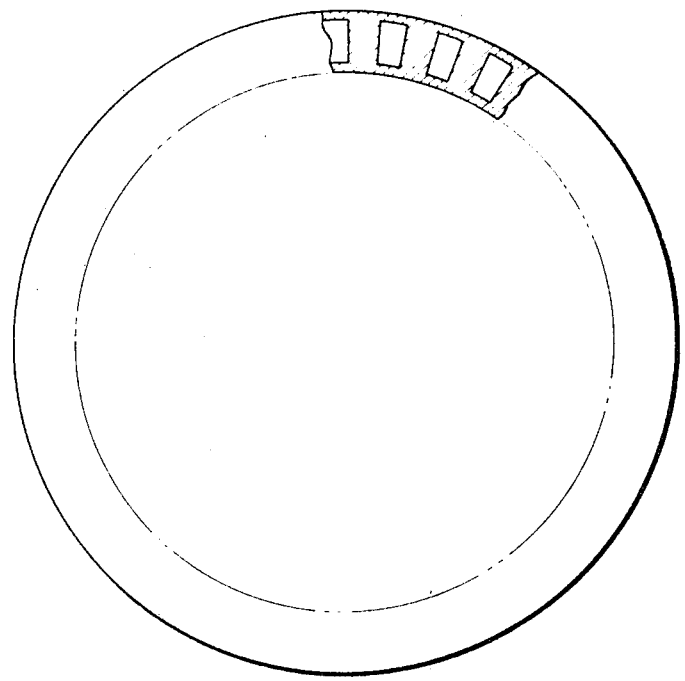

FIG. 3
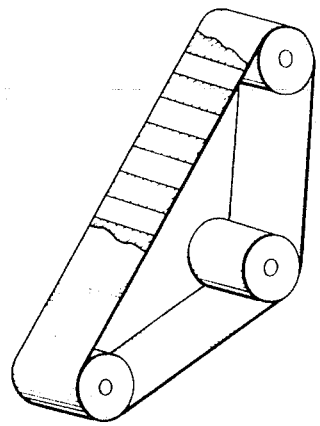

FIG. 4C $E_s$ 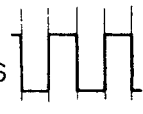

FIG. 5
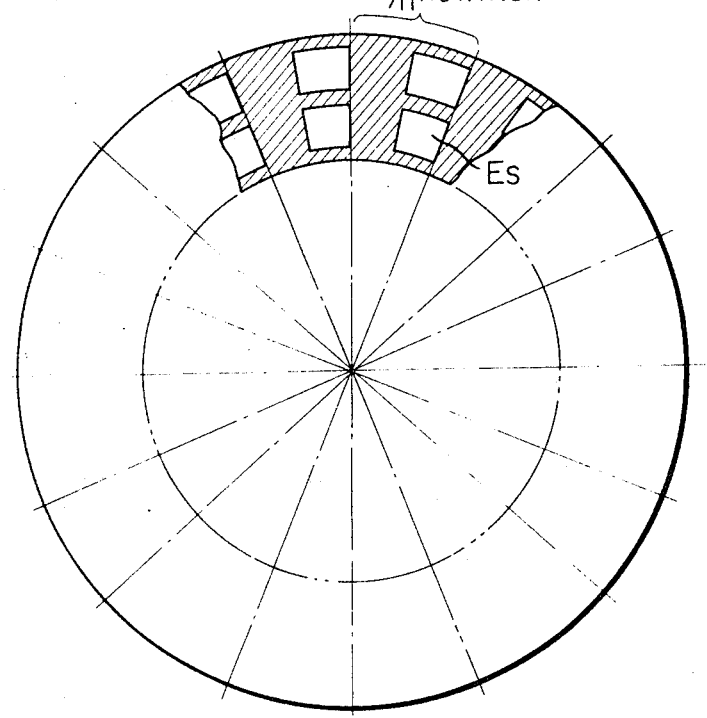

Patented July 10, 1973 3,744,914

FIG.9E (IN CASE OF a)

(IN CASE OF b)

(IN CASE OF c)

(IN CASE OF d)

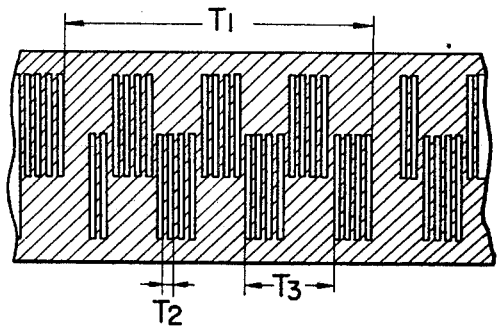
FIG.20A
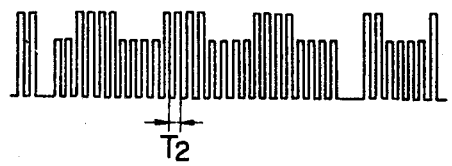
FIG.20B
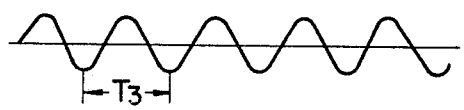
FIG.20C
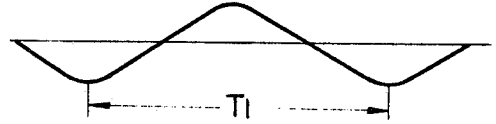
FIG.20D
FIG. 21
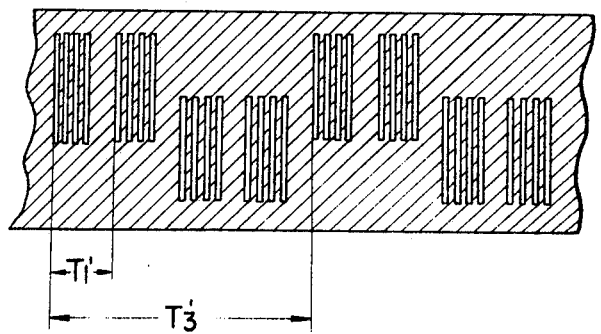

AUTOMATIC POSITIONING DEVICE

BACKGROUND OF THE INVENTION

1. Field of the Invention

This invention relates to a device for automatically positioning an object in a plane.

2. Description of the Prior Art

Positioning for registration of circuit pattern mask and wafer in the manufacture of integral circuits has heretofore been accomplished by manually moving the pattern for registration while viewing it through a microscope. In the conventional lens meter, determining an optical axis of a sample lens has been attained by manually moving the sample lens in the direction perpendicular to the optical axis and by matching a reference cross on a focusing screen with an image of a target on the focusing screen while viewing them through a viewing telescope.

This technique has required much skill and has unavoidably resulted in inaccuracy of positioning. Moreover, where the positioning work takes a long time, the energy devoted thereto would fatigue the viewer to such an extent that he finds it difficult to continue the work.

Also, in the automatic trailing of the sun, a method using a plurality of photoelectric detectors has been practiced whereby the system is operated so that the output difference between the detectors becomes zero. In such a method, the instability of the detector elements generally affects the stability of the entire system and, therefore, the elements must be selected for a uniform characteristic and may be susceptible of aging which would result in the instability of such elements and accordingly, the inability to accomplish good control.

SUMMARY OF THE INVENTION

It is a general object of the present invention to provide an automatic positioning device which has overcome the foregoing difficulties and disadvantages existing in the prior art of positioning an object in a plane, including the inaccuracy of measurement resulting from the degree of skill, personal characteristics, fatigue and other factors of the viewer, and the selection of elements to be used.

According to a basic feature of the present invention, the automatic positioning device comprises a light source, a member formed with an opening for passing therethrough light from the light source, scanning means having a chart of a predetermined period and moved at a predetermined velocity, and an optical system for focusing the light passed through the opening so as to form an image of the opening on the chart. The chart of the scanning means is adapted to scan the image of the opening when the scanning means is moved, thereby providing a light control signal of the same period as that of the chart. The positioning device may further include a photoelectric element for receiving the light control signal and converting it into an electrical control signal, reference signal generating means for generating an electrical reference signal synchronous with and of the same period as the electrical control signal, phase difference measuring means for measuring the phase difference between the electrical control and reference signals, and drive means operable in response to an output signal from the phase difference measuring means to move either the optical system or the member formed with the opening in a direction perpendicular to the optical axis of the optical system so that the phase difference between said electrical control and reference signals attains a predetermined level.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein:

FIG. 1(A) is a schematic view of an optical system of the class described incorporated in a conventional lens meter;

FIG. 1(B) is a field view of the same optical system illustrating an example wherein a sample lens is eccentric with respect to the optical axis of the system;

FIG. 1(C) is a view similar to FIG. 1(B), but illustrating an example wherein the sample lens is concentric with respect to the optical axis of the system;

FIG. 2 is an enlarged plan view of a chart carrier in the form of a disc according to an embodiment of the present invention, the chart carrier being partly broken away to show a chart formed therein;

FIG. 3 is an enlarged perspective view of a chart carrier in the form of an endless tape according to the present invention, the chart carrier being partly broken away to show a chart formed therein;

FIGS. 4(A) to 4(E) illustrate the details of the chart and the waveforms of the signal provided by such chart;

FIG. 5 shows a chart for providing a control signal and a chart for providing a reference signal;

FIGS. 9(A) to 9(H) illustrate the waveforms of the signals provided by the chart of FIGS. 7 or 8;

FIGS. 20(A) to 20(D) show an enlarged fragmentary view of a similar control signal generating chart and illustrate the waveforms of the output signals provided thereby;

FIG. 21 shows a modification of the control signal generating chart shown in FIGS. 13, 19 and 20(A)

DESCRIPTION OF THE PREFERRED EMBODIMENTS

Figure 4A:
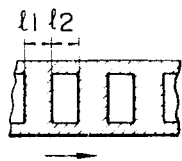

In order to understand the first application of the present invention, it is essential to understand the conventional lens meter.

Referring to FIGS. 1(A) to 1(C), the conventional lens meter comprises a lamp 1, a target 2, a collimater lens 3, a sample lens 4, a viewing telescope 5 and a focusing screen 6 formed with a reference cross. In such a lens meter, a viewer moves the sample lens in X and Y directions while viewing it through the telescope until the target image eccentric with respect to the center of the cross in the viewing telescope (FIG. 1(B)) becomes concentric therewith, as shown in FIG. 1(C), thereby determining the optical axis of the sample lens.

An embodiment of the present invention as applied to a lens meter will be described hereinafter with reference to FIGS. 1 to 14.

Figure 14:
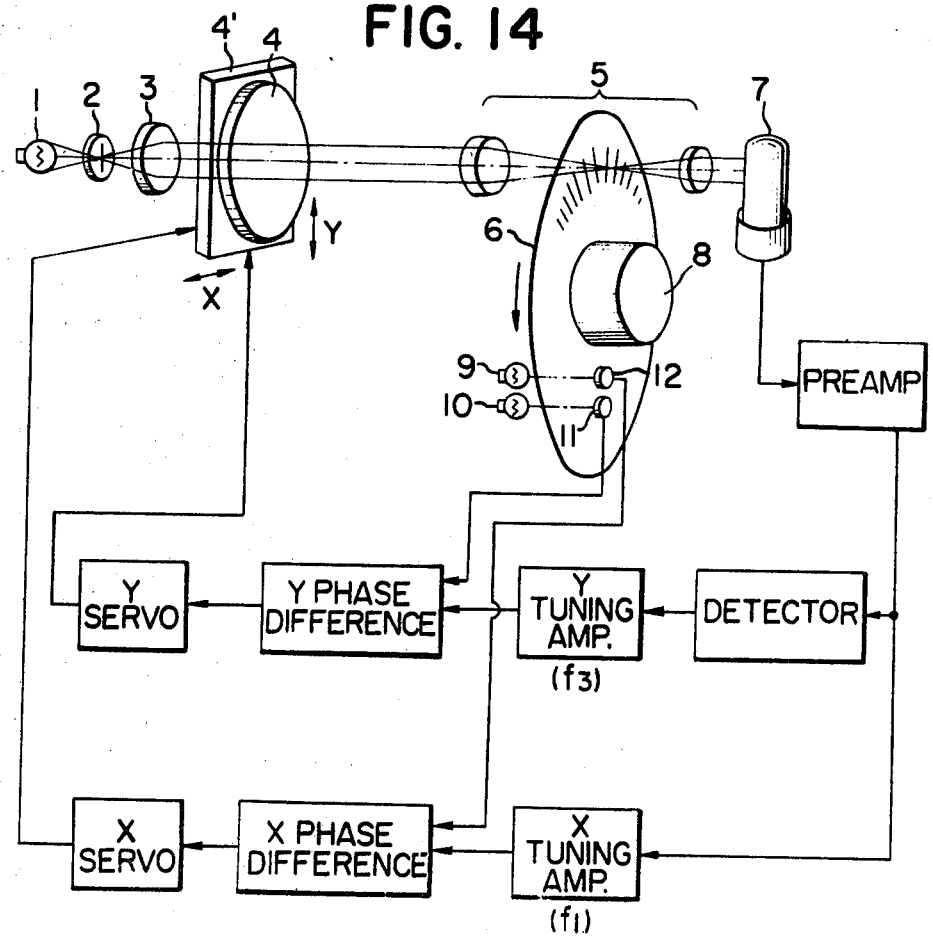
FIG. 14 is a block diagram of an embodiment of the present invention as applied to a lens meter.

Referring first to FIG. 14, there is shown a form of the present invention as embodied in a lens meter for automatically determining the two-dimensional position of a sample object (lens). The lens meter includes an illuminating lamp 1, a pin-hole or slit means 2, a collimater lens 3, and an object supporting plate 4' which is movable along X- and Y-axis in a plane perpendicular to the optical axis. A sample object such as lens 4 is supported on the supporting plate 4'. A viewing telescope 5 is arranged to form the optical system of the lens meter. A scanning chart carrier 6 is disposed in a plane in which the image of the pin-hole or slit means 2 is formed. A photoelectric converter 7 is disposed on the optical axis of the lens meter and to the right of the viewing telescope 5, as viewed. A constant speed motor 8 is provided to rotate the scanning chart carrier 6 at a predetermined speed. At the opposite sides of the scanning chart carrier 6 in the lower portion thereof, there are a pair of lamps 9, 10 and a pair of photoelectric converters 11, 12, respectively. The photo-electric converters 11, 12 cooperate with reference signal generating charts of the chart carrier 6 to provide Y and X reference signals, respectively. The photoelectric converter 7 is connected with a preamplifier which, in turn, is connected with an X tuning amplifier (or band-pass filter) and with a Y tuning amplifier (or band-pass filter) through a detector. The X tuning amplifier or band-pass filter and the X reference signal generating photoelectric converter 12 are both connected with an X servo drive system through an X phase difference meter so as to drive the object supporting plate 4' to move in the X-axis direction. The Y tuning amplifier or band-pass filter and the Y reference signal generating photoelectric converter 11 are both connected with a Y servo drive system through a Y phase difference meter so as to drive the object supporting plate 4' to move in the Y-axis direction.

Figure 4B:
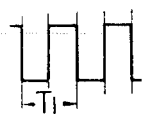

Description will now be made of the patterns of the control signal chart and reference signal chart on the chart carrier 6 and of their automatic control actions. FIG. 2 shows a continuous black-and-white chart for a control signal in the form of a disc, and FIG. 3 shows a continuous black-and-white chart in the form of an endless tape. A part of such chart is shown on an enlarged scale in FIG. 4(A). The white sections of the black-and-white chart are free to transmit light rays therethrough while the black sections intercept light rays. Each black section has a width $l_1$ while each white section has a width $l_2$, and these black and white sections are arranged regularly and alternately. On the black-and-white chart there is formed a point or linear image of the pin-hole or slit means 2 which is displaceable with the movement of the sample object 4 (in case of linear image, its longitudinal direction is the same as the longitudinal direction of the chart). As the formed image is displaced at a predetermined speed in the direction indicated by the arrow in FIG. 4(A), a light control signal comprising a series of lights and shades, as shown in FIG. 4(B), will be provided by the chart. Such light control signal is converted by the photoelectric converter 7 into a voltage or current control output signal of a predetermined period $T_1$. It is here assumed that the entire circumference of the chart shown in FIG. 2 is divided by an integer n which corresponds to the number of pairs of black and white sections, and that the number of revolutions of the disc is N r.p.m. Then, the period $T_1$ may be expressed as:

$$T_1 = 1/f_1 = 60/(nN) \text{ (sec.)},$$

where $f_1$ represents frequency (Hz).

Figure 4D:
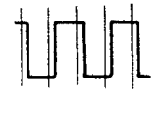
Figure 4E:
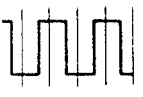
Figure 6A:
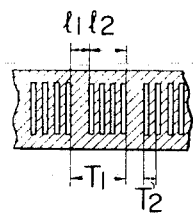
FIGS. 6(A) to 6(C) illustrate a chart for providing two frequencies and the waveforms of its output signals.
Figure 6B:
Figure 6C:

On the other hand, a black-and-white chart for a reference signal which has the same period as that of the control signal chart should be prepared. The reference signal chart cooperates with another light source 9 and another photoelectric converter 12 to provide a reference signal of a period $T_1$. FIG. 5 shows that the control signal chart is disposed on the outer surface of the chart disc and the reference signal chart is on the inner surface. The aforesaid control output signal and the reference signal Es are both applied to the X phase difference meter. If the point or linear image displaced with the movement of the object 4 goes back and forth along the direction of rotation of the chart, the control output signal will assume the waveforms as shown in FIGS. 4(D) and 4(E), which are out of phase with respect to each other. By presetting such that these waveforms are in phase at a certain given image position, the control signal resulting from the back and forth movement of the image will be detected as a phase advance or delay relative to the reference signal Es. In this way, a phase difference is detected between the reference signal Es and the control signal B. This phase difference measurement is electrically accomplished and its accuracy is very high. In accordance with such detection signal, the X servo drive system is operated to move the object supporting plate 4' so as to automatically position the object thereon in a direction the same as or opposite to the direction of movement of the chart. The width $l_1$ of the black section in the chart need not always be equal to the width $l_2$ of the white section, but they may be in the relation that $l_2 > l_1$, as shown in FIG. 6(A), for example. If a further black-and-white chart of a period $T_2$ which is $1/n'$ of the period $T_1$ (where $n'$ is an integer and shown as $n'=5$) is superposed on the foregoing chart, there will be obtained a light control signal comprising a series of lights and shades, as shown in FIG. 6(B). Such light control signal may be photoelectrically converted and then subjected to a tuning amplification at a frequency of $f_2 = 1/T_2$, whereafter it is detected and subjected to a tuning amplification at a frequency of $f_1$, thereby providing a signal as shown in FIG. 6(C). By measuring the phase difference between such signal and the reference signal Es, automatic positioning of the object in the scanning direction can be accomplished, as described previously. This is performed in the form of a frequency $f_1$ modulated at a frequency $f_2$ and provides an improved S/N ratio. Alternatively, a phase difference meter having the same degree of measuring accuracy may be used to improve the control accuracy by a frequency ratio $f_2/f_1$ by generating a reference signal of frequency $f_2$ from a reference signal chart carried on the same chart disc, measuring the phase difference between said reference signal and a control signal of frequency $f_2$ and controlling a greater displacement in accordance with a phase difference output between the control signal and the reference one of frequency $f_1$ and changing over the phase difference output to control the displacement from $f_1$ to $f_2$ when the phase difference output of frequency $f_1$ is reduced below a certain level.

Figure 7:
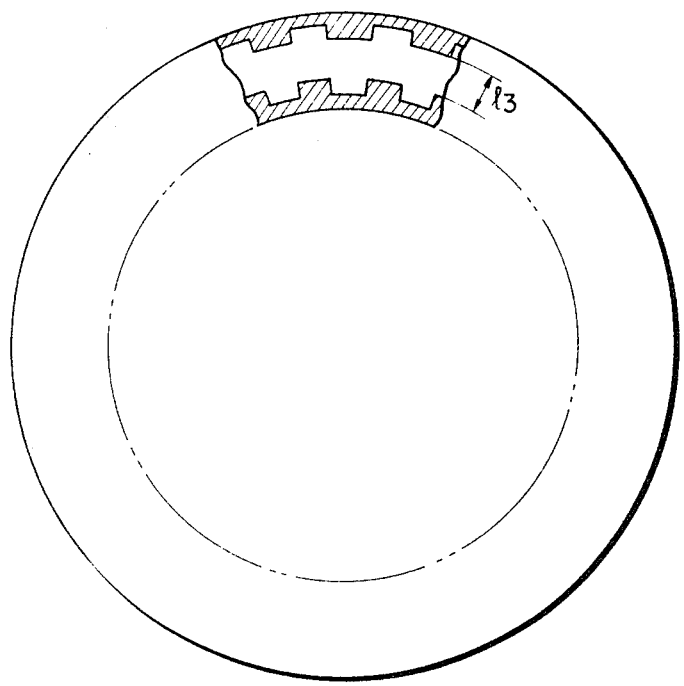
FIG. 7 is an enlarged plan view of a chart carrier in the form of a disc for providing a control signal perpendicular to the scanning direction according to an embodiment of the present invention, the chart carrier being partly broken away to show a chart formed therein.

FIG. 7 shows a disc-shaped chart carrier carrying thereon opposed land and groove charts, each of which comprises a pattern of alternate black and white forms arranged in the circular configuration, the length $l_3$ being provided to be slightly shorter than the length of the point or linear image, and each white section of one such configuration being opposed to each black section of the other such configuration so that the lights and shades may be reversed in accordance with the vertical movement of the image.

Figure 8:
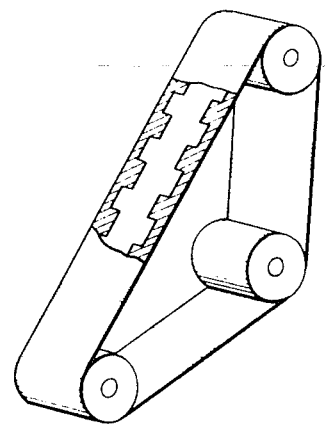
FIG. 8 is an enlarged perspective view of a chart carrier in the form of an endless tape according to the present invention, the chart carrier being partly broken away to show a chart similar to that of FIG. 7.
Figure 9A:
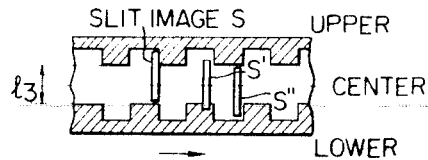
Figure 9B:
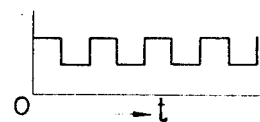
Figure 9C:
Figure 9D:
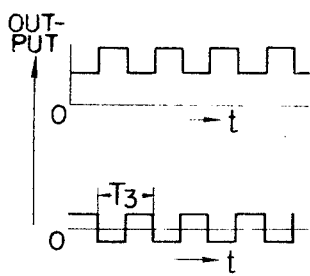
Figure 9F:
Figure 9G:
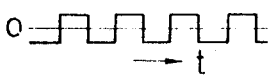

FIG. 8 shows a tape-like chart carrier carrying thereon opposed land and groove charts similar to those shown in FIG. 7. A part of such a chart is shown on an enlarged scale in FIG. 9(A). This chart is moved at a predetermined speed in the direction of the arrow so that a point or linear image of the pin-hole or slit means 2 may be formed on the chart. If the image formed is linear, the linear image is perpendicular to the direction of movement of the chart. For example, where the image is upwardly deviated from the center of the chart to be located at a position S, as shown in FIG. 9(A), a light control signal, as shown in FIG. 9(B), will result from the light passing through the chart. If the image is located at a position S', a light control signal, as shown in FIG. 9(C), will be obtained. If the image is further deviated downwardly past the center of the chart to be located at a position S'', there will be obtained a light control signal opposite in phase to that shown in FIG. 9(B), as shown in FIG. 9(D). If these three phases of light control signal are photoelectrically converted to derive an AC component alone, the waveforms of the three control signals will be such, as shown in FIGS. 9(E) to 9(G), respectively, where $T_3$ represents the period. On the same chart carrier, there is a further black-and-white chart comprising, as shown by Es' in FIG. 10, an alternate arrangement of black and white sections so as to provide a period $T_3$, so that a signal of period $T_3$ may be obtained from such additional chart through the light source 10 and the photoelectric converter 11.

Figure 9H:
Figure 10:
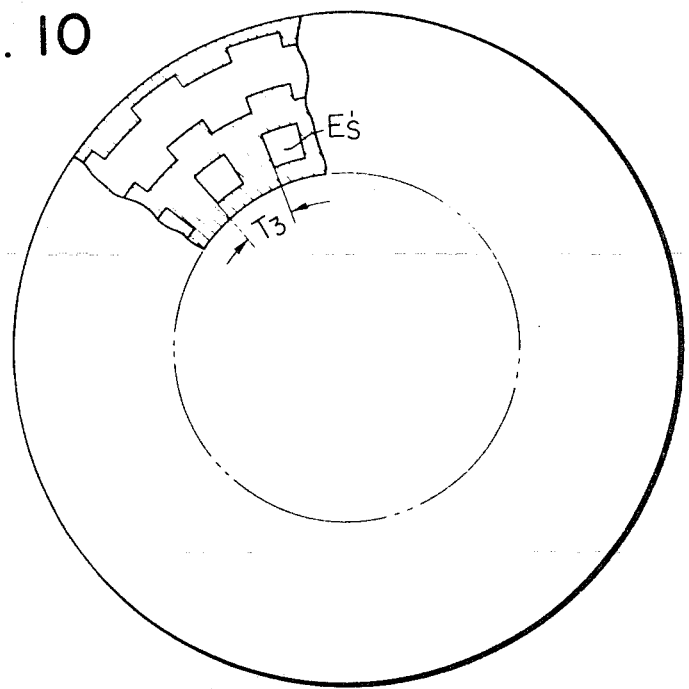
FIG. 10 is an enlarged, partly broken-away, plan view of a disc-shaped chart carrier for providing a control signal perpendicular to the scanning direction and a reference signal.

The waveform of the signal obtained from the additional chart is illustrated in FIG. 9(H). This signal is hereinafter referred to as reference signal Es'. The control signal thus-obtained and the reference signal Es' are both applied to the Y phase difference meter, where the phase difference between the two signals is accurately measured, and when the two signals are in phase or in opposite phase, the output signal from that meter is used to operate the Y servo drive system to cause the object supporting plate to be vertically moved until the waveform of the control signal will be such as shown in FIG. 9(F). Therefore, the automatic vertical positioning is accomplished.

Figure 11:
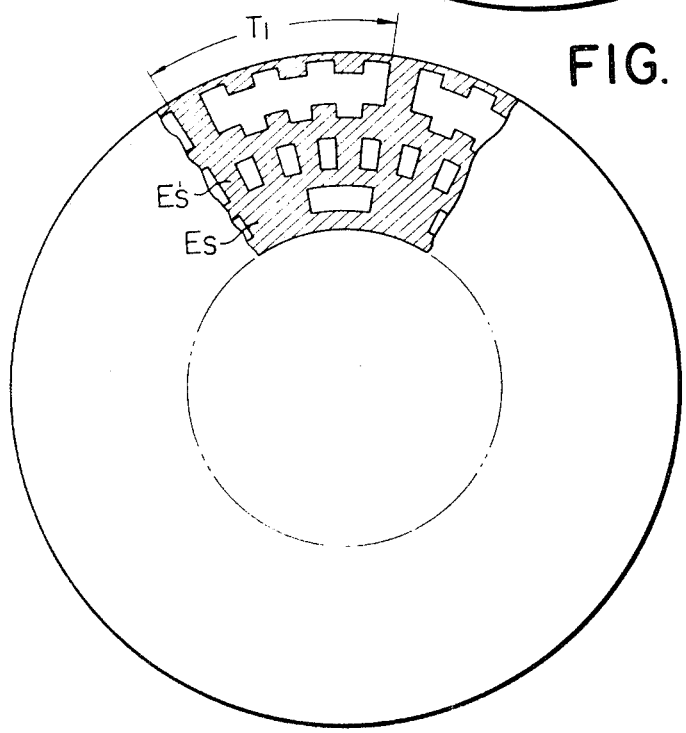
FIG. 11 is an enlarged, partly broken-away, plan view of a disc-shaped chart carrier for providing two-dimensional control signals and a reference signal according to an embodiment of the present invention.

FIG. 11 illustrates a chart arrangement for the two-dimensional positioning of an object 4 with the aid of a point or linear image displaced with the movement of the object. As shown, a single chart carrier disc carries thereon a composite chart for providing control signals and two other charts for providing respective reference signals Es and Es'. The composite chart comprises two united charts, one of which is a continuous black-and-white chart for providing a control signal in the scanning direction and consists of regularly arranged alternate black and white sections. The other of the composite chart is a black-and-white chart for providing a control signal perpendicular to the scanning direction and consists of a land and groove pattern of black and white sections spaced apart a predetermined interval. Each black section in one pattern is opposed to each white section in the other pattern. The reference signals Es and Es' shown in FIG. 11 are similar to those provided by the previously described reference signal charts.

Figure 12:
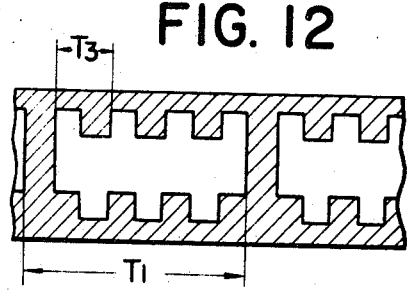
FIG. 12 is an enlarged fragmentary view of the chart for providing the control signals shown in FIG. 11.

FIG. 12 shows the control signals charts of FIG. 11 on an enlarged scale. The alternate black-and-white chart and the opposed land and groove chart shown in FIGS. 11 and 12 are of periods $T_1$ and $T_3$, respectively, $T_1$ being equal to $4T_3$. These charts are moved circularly at a predetermined speed to form thereon a point or linear image displaced with the movement of the object, whereby a frequency $f_1$ of period $T_1$ and a frequency $f_3$ of period $T_3$ are obtained through a single photoelectric converter 7. The signals thus-provided are selected by X and Y tuning amplifiers (band-pass filters) of different frequencies such as $f_1$ and $f_3$, and the phase differences between such signals and the reference signals of respective frequencies are measured by X and Y phase difference meters. In accordance with the measurement signals of these meters, the respective X and Y servo drive systems are operated to accomplish the automatic two-dimensional positioning of the object. In this case, the functions of the respective charts are similar to what has been described above. The entire arrangement of the present embodiment is shown as a block diagram in FIG. 14, which has already been referred to.

Figure 13:
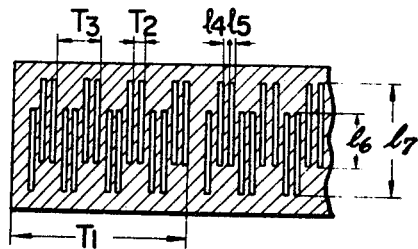
FIG. 13 is an enlarged fragmentary view of a chart for modulating a frequency of $T_2$ at a frequency of $T_3$ and further superposing a frequency of $T_1$ upon the modulated frequency.

FIG. 13 shows, in superposed relationship, a black-and-white chart having a period $T_2$ which is $1/n'$ of the period $T_1$ and whose frequency is $f_2=1/T_2$, and the control signal chart of FIG. 12. The frequency $f_2$ provided thereby is modulated at frequencies $f_3$ and $f_1$ to accomplish the automatic two-dimensional positioning in the scanning or X direction and in the Y direction perpendicular to the scanning direction. In FIG. 13, the ratio of $T_2:T_3:T_1=1:4:16$ is adopted to improve the SN ratio. In addition to such ratio of $T_2:T_3:T_1=1:4:16$, by selecting a length $l_6$ for the interval between the inner ends of the white sections in the opposed land and groove chart, a length $l_7$ for the interval between the outer ends of such white sections, a length $l_4$ for the width of each black section in the black-and-white chart of period $T_2$, and a length $l_5$ for the width of each white section in such chart, and further by selecting numerical values $l_4 = l_5 = 1mm$, $l_6 = 10mm$ and $l_7 = 20mm$, it has been found that an accuracy of centering within ±0.005 diopter (±3 microns) in either of the longitudinal and transverse directions can be obtained for a lens of ±10 diopters.

Figure 22:
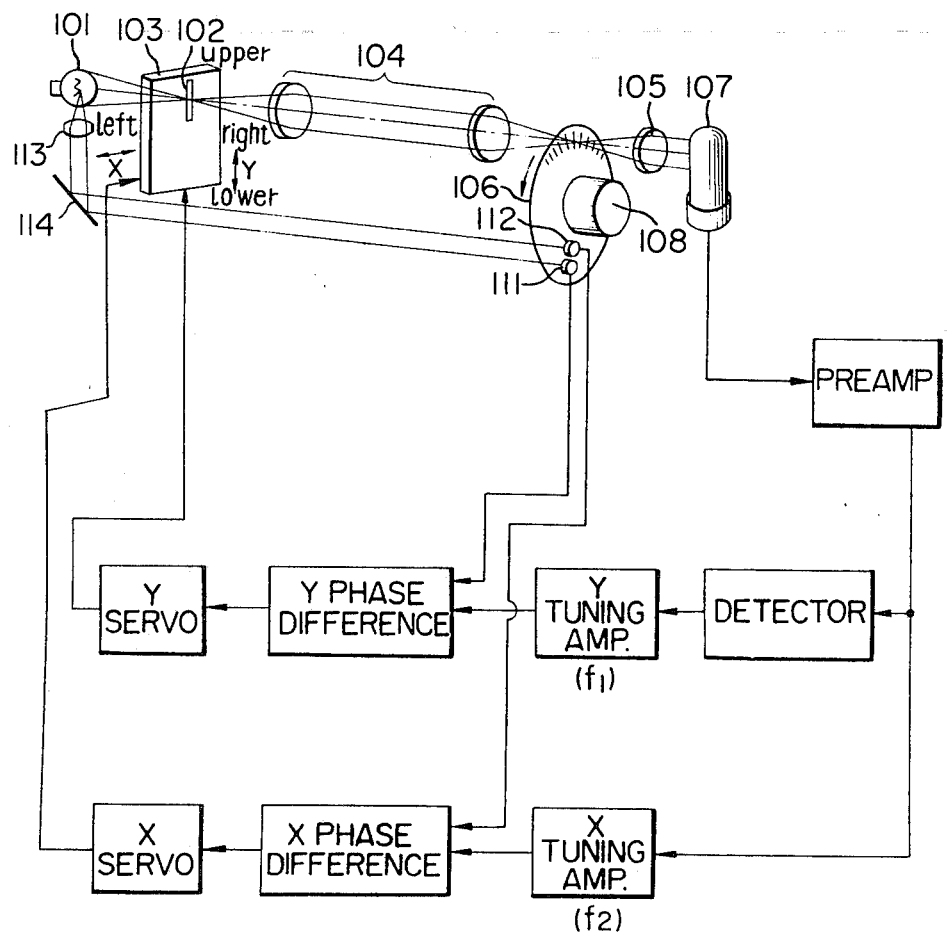
FIG. 22 is a block diagram of an application of the present invention.

Next, another embodiment of the present invention will be described with reference to FIGS. 15 to 22. FIG. 22 shows another application of the present invention in block diagram. As shown, the arrangement includes an illuminating lamp 101 and positioning means such as slit 102 provided on an object 103, which may, for example, be a mask or a wafer used to make an integrated circuit. The object 103 is supported and moved in two-dimensional directions perpendicular to the optical axis of an objective lens system 104 by a conventional supporting plate (not shown) which is movable in two-dimensional directions, i.e., X-axis (horizontal) direction and Y-axis (vertical) direction. A scanning chart plate 106 having a control signal generating chart, to be described, is disposed so that the image of the slit 102 is formed on the control signal generating chart by the objective lens system 104. A photoelectric converter 107 is provided on the optical axis of a condenser 105. A constant-speed motor 108 is provided to rotate the scanning chart plate 106 at a predetermined speed. There are provided further photoelectric converters 111, 112, a condenser lens 113 and a mirror 114.

In the above-described arrangement, a reference signal generating chart, to be described hereinafter, is provided in the chart plate 106 and may be illuminated by the lamp 101 through the condenser lens 113 and mirror 114 so that an electrical X reference signal and an electrical Y reference signal may be provided from the photoelectric converters 111 and 112, respectively.

The photoelectric converter 107 is connected through a preamplifier with an X tuning amplifier (or band-pass filter) and with a Y tuning amplifier (or band-pass filter). The X tuning amplifier (or band-pass filter) and the photoelectric converter 112, for providing the X reference signal, are connected with an X phase difference meter which, in turn, is connected with an X servo drive system for driving the object supporting plate in the X-axis direction. A detector is connected between the Y tuning amplifier (or band-pass filter) and the preamplifier. The Y tuning amplifier and the photoelectric converter 111, for providing the Y reference signal, are connected with a Y phase difference meter which, in turn, is connected with a Y servo drive system for driving the object supporting plate in the Y-axis direction.

Description will now be made of the control signal generating chart and reference signal generating chart on the chart plate 106 and of the automatic control effected by these charts.

Figure 15:
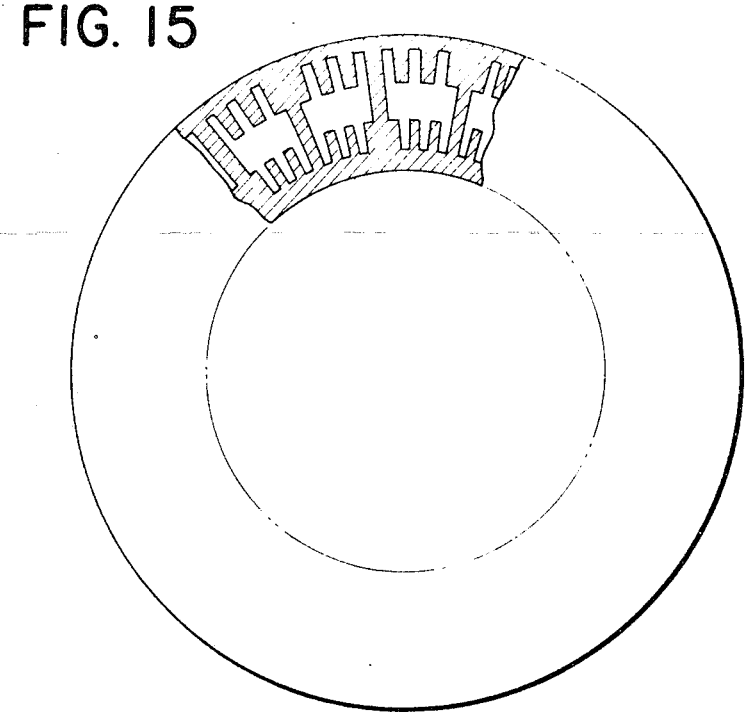
FIG. 15 is a partly broken-away plan view of a modified control signal generating chart in the form of a disc according to another embodiment of the present invention.
Figure 16:
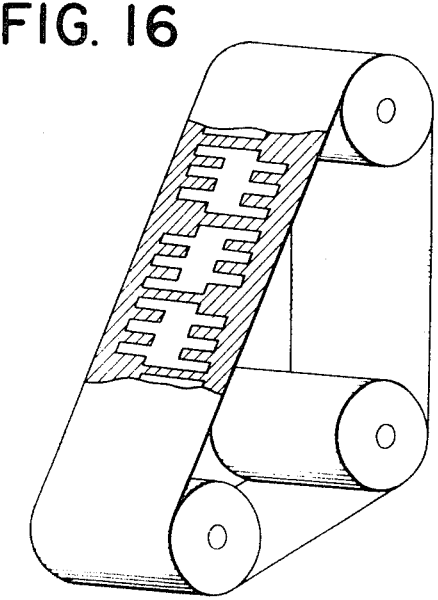
FIG. 16 is a partly broken-away perspective view of a chart similar in function to that of FIG. 15, but in the form of an endless belt.

FIG. 15 shows a control signal generating chart in the form of a disc and FIG. 16 shows a control signal generating chart in the form of an endless belt. A part of such control signal generating chart is shown on an enlarged scale in FIG. 17(A). The chart shown therein is a continuous black-and-white chart which comprises a continuous, alternate arrangement of black-and-white rectangular patterns having a width $l_1'$ and black-and-white rectangular patterns having a width $l_2'$. Each rectangular pattern having the width $l_1'$ consists of a white section having a length $l_3'$ and a black section having the length $l_4'$ and each rectangular pattern having the width $l_2'$ consists of a black section having a length $l_4'$ and a white section having a length $l_3'$ which are disposed oppositely to those white and black sections of the first-named rectangular patterns. Adjacent white and black sections in these patterns are contiguous to each other. An exclusively black pattern having a length $l_3' + l_4'$ and a width $l_1'$ or $l_2'$ is disposed at every $n$ black-and-white rectangular patterns. Each white section is free to transmit light therethrough, whereas each black section intercepts light. In the illustrated form, $n$ representing the number of the exclusively black patterns is seven.

Figure 17A:
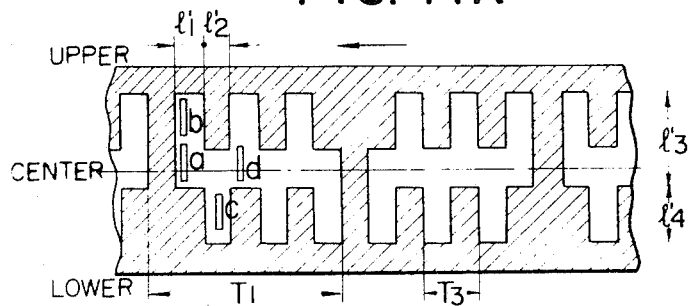
FIGS. 17(A) 17 to (I) show an enlarged fragmentary view of the control signal generating chart and further illustrate the waveforms of the output signals provided thereby and the reference signals.
Figure 17B:
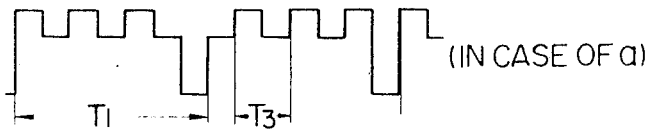
Figure 17C:
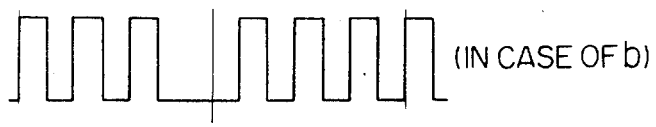
Figure 17D:
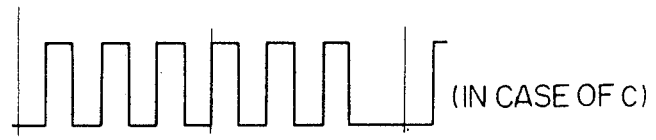

A predetermined point of line such as slit on the object or mask for forming an integrated circuit is focused on the above-described continuous black-and-white chart. In case of a slit or line, the longitudinal direction of the line and that of the chart are aligned with each other. When the chart plate 106 is rotated at a predetermined speed in the direction indicated by the arrow in FIG. 17(A), the chart thereon is also moved to provide therefrom a light control signal comprising continuous lights and shades, as shown in FIG. 17(B). The waveform shown in FIG. 17(B) represents the case where the center of the linear image is deviated slightly upwardly from the center line of the chart, as indicated at a in FIG. 17(A), where the center period is represented by $T_3$ and the longer period is represented by $T_1$. If the linear image is displaced further upwardly to take a position, as indicated at b in FIG. 17(A), the resulting waveform will be such as shown in FIG. 17(C). Conversely, if the linear image is displaced downwardly to take a position c in FIG. 17(A), the resulting waveform will be such as shown in FIG. 17(D). The waveform of FIG. 17(C) for the upward displacement of the linear image and the waveform of FIG. 17(D) for the downward displacement of the linear image have their respective periods $T_3$ opposite in phase to each other. In this way, the movement of the chart having the above-described patterns causes the image to be displaced up and down to thereby provide lights and shades repeated at a period $T_3$. The light control signals representing the lights and shades thus-provided are converted into electrical control signals in the form of current or voltage by the photo-electric converter 107, whose output signals are applied through the preamplifier and the detector to the Y tuning amplifier (or band-pass filter). From among the signals delivered from the photoelectric converter 107, the Y tuning amplifier selects an electrical control signal having a frequency $f_3 = 1/T_3$.

Figure 17E:
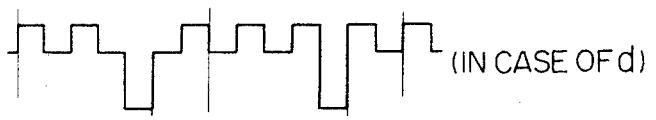
Figure 17F:
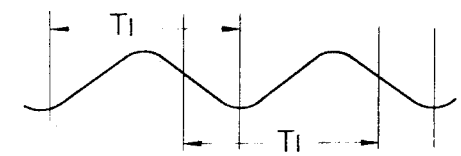
Figure 17G:
Figure 17H:
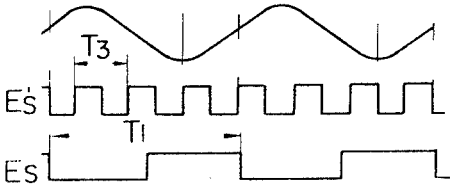
Figure 18:
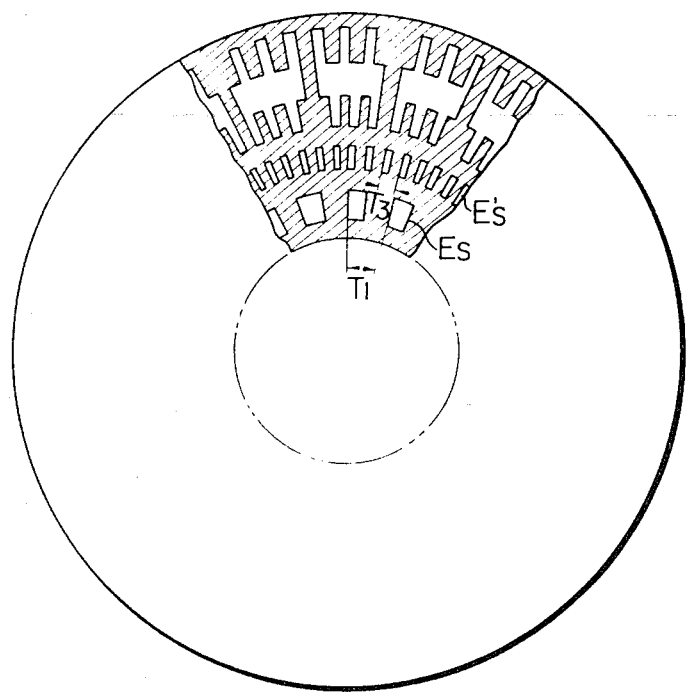
FIG. 18 is a plan view partly broken-away to show another form of the present invention.

On the other hand, the chart plate 106 is also provided with a black-and-white chart, as indicated at Es' in FIG. 18, and having a period $T_3$. When the chart plate 106 is illuminated by the light source 101 through the lens 113 and mirror 114, the photoelectric converter 111 produces an AC signal having a period $T_3$ which represents the chart Es'. Such signal has a waveform as shown in FIG. 17(H) and is hereinafter referred to as reference signal Es'. Thus, by precisely measuring the phase difference between the control signal $F_3$ of the frequency $f_3$ and the reference signal Es', the upward and downward movements of the image can be accurately converted into electrical signals. The phase difference between the control signal and the reference signal is measured by the Y phase difference meter, whose output signal is applied to operate the Y servo drive system to thereby move the object supporting plate vertically for the automatic vertical positioning. The direction of vertical movement of the image is perpendicular to the chart scanning direction and the same as the Y-axis direction of the object supporting plate.

The control chart shown in FIG. 18 is improved over the control chart of FIG. 11 in the following point. In the chart of FIG. 11, when the image of the slit is upwardly deviated from the center of the chart (shown at the position S in FIG. 9(A)), the control signal of four pulses is generated in the period $T_1$, and when the image of the slit is downwardly deviated from the center of the chart (shown at the position S'' in FIG. 9(A)), the control signal of three pulses is generated in the same period. Therefore, the detective sensitivity of the upper land and groove part of the chart and that of the lower land and groove part are not equal in FIG. 11. Instead, the detective sensitivity of the upper part of the chart and that of the lower part are equal in FIG. 18 because the number of the white sections in the upper part (i.e., having the length $l_1$ in FIG. 17) and that in the lower part (i.e., having the length $l_2$) are equal.

Positioning the object in the scanning direction will now be discussed. For example, when the linear image is in the position a of FIG. 17(A) where the center of the image is deviated slightly upwardly from the center line of the chart, or when the linear image is displaced in the direction opposite to the chart scanning direction to assume the position d of FIG. 17(A), then the light control signal provided will take the waveform as shown in FIG. 17(B) or 17(E), respectively. Thus, due to the exclusively black pattern and the black-and-white regular patterns forming the chart, repetition of light and shade at a period $T_1$ may result from the horizontal movement of the linear image. The light control signals provided by such light and shade are converted into electrical signals in the form of current or voltage by the photoelectric converter 107 in the same way as described previously, and the output signals of the photoelectric converter 107 are applied through the preamplifier to the X tuning amplifier (or band-pass filter). From among these applied signals, the X tuning amplifier selects a control signal of a frequency $f_1 = 1/T_1$. The signal in FIG. 17(B), provided for the linear image at the position a of FIG. 17(A), becomes a sine wave, as shown in FIG. 17(F), and the signal in FIG. 17(E), provided for the linear image at the position d of FIG. 17(A), becomes a sine wave, as shown in FIG. 17(G), both having a period $T_1$. Thus, the signal provided is varied in phase as the linear image is moved back and forth along the chart scanning direction.

Figure 17I:
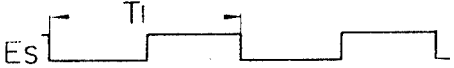

On the other hand, the chart plate 106 is further provided with a black-and-white chart of period $T_1$, as shown at Es in FIG. 18. When the chart plate 106 is illuminated by the light source 101 through the lens 113 and mirror 114, the photoelectric converter 112 produces an AC signal of period $T_1$. Such signal has the waveform as shown in FIG. 17(I) and is hereinafter referred to as reference signal Es'. The aforesaid control signal $F_1$ of the frequency $f_1$ and the reference signal Es are applied to the X phase difference meter which is preset so that these two signals are in phase for a predetermined position of the image. Thus, the signal provided for horizontal movement of the image is measured as phase advance or delay thereof with respect to the reference signal, namely, as a phase difference. The phase difference thus-obtained is formed into a signal which operates the X servo drive system to move the object supporting plate horizontally for its horizontal positioning. The direction of horizontal movement of the image is the chart scanning direction and corresponds to the X-axis direction of the object supporting plate.

In this way, signals of different frequencies $f_1$ and $f_3$, provided from a common chart plate, are compared with the respective reference signals Es and Es' to obtain the phase difference between the signals $F_1$, $F_2$ and the reference signals Es, Es'. The phase differences are applied to the respective servo drive systems so that the object supporting plate is moved simultaneously in two directions, i.e., in the direction perpendicular to the chart scanning direction of the image and in the chart scanning direction, thereby automatically positioning the object such as mask or wafer for an integrated circuit.

Figure 19:
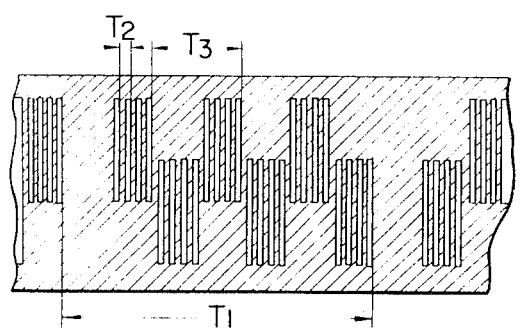
FIG. 19 is an enlarged fragmentary view of still another form of the control signal generating chart according to the present invention.

The widths $l_1'$ and $l_2'$ of the rectangular patterns need not always be equal to each other. Further, in case of a composite chart comprising united black-and-white charts of a period $T_2$ shorter than the periods $T_1$ and $T_3$, as shown in FIG. 19 or FIG. 20(A), there is obtained a light control signal consisting of such lights and shades as illustrated in FIG. 20(B). In the chart of FIG. 19, the widths $l_1'$ and $l_2'$ of the rectangular patterns are equal and the width of the exclusively black pattern is also equal to the widths $l_1'$ and $l_2'$. In the chart of FIG. 20, the widths $l_1'$ and $l_2'$ of the rectangular patterns are equal to those widths. The aforesaid light control signal is converted into an electrical signal, which is tuning-amplified into a frequency $f_2 = 1/T_2$ and then detected and tuning-amplified into a frequency $f_3$. Thus, there is provided a signal of period $T_3$, as shown in FIG. 20(C). Such frequency amplifications serve to improve the S/N ratio. If the signal of FIG. 20(B) is further tuning-amplified into a frequency $f_1$, there will be obtained a signal of period $T_1$, as shown in FIG. 20(D). Such signal controls the image movement along the chart scanning direction as already described. However, the phase difference may be measured at the frequency $f_1$ to control the image movement and the phase difference output signal thus-provided may be changed over to a phase difference output signal of frequency $f_2$ when the former output signal becomes lower than a certain level, whereby the accuracy of measurement can be enhanced by an amount corresponding to the frequency ratio $f_1/f_3$ through the use of the same phase difference meter. In FIG. 20(A), the frequencies are at the ratio of $f:f_1:f_2:f_3 = 1:2.8:3.5$.

The control charts described hereinbefore have been in the relation that $T_1 > T_3$, but as shown in FIG. 21, a control chart may be in the relation that $T_1' > T_3'$.

The white sections of the chart transmit light therethrough in both embodiments of FIGS. 14 and 22, but the white sections may be made so as to reflect light impinging thereon so that the photoelectric converter 107 can receive the light reflected on the white sections.

Thus, according to the present invention, the automatic positioning of an object can be accomplished with high sensitivity and high accuracy and is effected in accordance with measured phase differences without being affected by any variation in the characteristics of the light source and detector elements in use. Moreover, the mechanism employing the present invention is very simple and mechanically stable, and accordingly capable of stable operation for a long time and highly resistive to aging, thus contributing advantages of great commercial significance in the art.

What is claimed is:

1. An automatic positioning device comprising:
   a light source;
   a member formed with an opening for passing therethrough light from said light source;
   scanning means having a chart of a predetermined period and moved at a predetermined speed,
   an optical system for focusing the light passed through said opening so as to form an image of said opening on said chart;
   said chart being adapted to scan the image of said opening when said scanning means is moved, thereby providing a light control signal of the same period as that of said chart;
   a photoelectric element for receiving said light control signal and converting it into an electrical control signal;
   reference signal generating means for generating an electrical reference signal synchronous with and of the same period as said electrical control signal;
   phase difference measuring means for measuring the phase difference between said electrical control signal and said electrical reference signal; and
   drive means operable in response to an output signal from said phase difference measuring means to move said optical system or said member formed with said opening in a direction perpendicular to the optical axis of said optical system so that the phase difference between said electrical control signal and said reference signal attains a predetermined level.
   said chart for control signal comprising a first portion, a second portion and a third portion, said first portion consisting only of a transparent section extending in the scanning direction, the width of said first portion in the direction perpendicular to the scanning direction being slightly shorter than the length of the image of said opening, said second portion being projected from said first portion in one of the directions perpendicular to the scanning direction and consisting of transparent sections and opaque sections alternately arranged in the scanning direction so that a set of them forms one period, said third portion being projected from said first portion in the other direction perpendicular to said scanning direction and consisting of transparent sections and opaque sections alternately arranged in the scanning direction so as to have the same period as and the opposite phase to said second portion;
   said reference signal generating means including a chart holding member moved synchronously with said scanning means and having a chart for reference signal comprising transparent sections and opaque sections alternately arranged so as to have the same period as said second and third portions of said chart for control signal; a reference signal light source for illuminating said chart for reference signal; and a photoelectric element for receiving light from said reference signal light source scanned by said chart for reference signal and converting it into an electrical reference signal;
   said drive means being adapted to move said optical system or said member formed with said opening so that the image of said opening is moved in the direction perpendicular to the scanning direction.

2. An automatic positioning device comprising:
   an optical system for forming an image of an object;
   scanning means provided with a movable chart for scanning said image,
   said movable chart including a neutral portion extending in the scanning direction, a first portion being projected from said neutral portion in one of the directions perpendicular to the scanning direction and having first sections and second sections alternately arranged in the scanning direction so that a set of them forms one period, and a second portion being projected from said neutral portion in the other direction perpendicular to the scanning direction and having third sections and fourth sections alternately arranged in the scanning direction so as to have the same period as, and a phase different from, said first portion;
   photoelectrical converting means adapted to receive said image scanned by said movable chart,
   said photoelectrical converting means converting said image scanned on said first portion into a first electrical control signal having the same period as said first portion and converting said image scanned on said second portion into a second electrical control signal having the same period as said second portion;
   reference signal generating means for generating an electrical reference signal synchronous with movement of said movable chart,
   said electrical reference signal having the same period as said first and second electrical signals;
   phase difference measuring means connected to said photoelectrical converting means and to said reference signal generating means for measuring the phase difference between said electrical control and reference signals and for generating an output corresponding to the measured phase difference; and drive means operable in response to said output from said phase difference measuring means to move at least said optical system or said object so as to position said image to said neutral portion.

3. A device according to claim 2, wherein said image of said object is a light image.

4. A device according to claim 3, wherein said reference signal generating means includes:

a light source;

a chart holding member moved synchronously with said movable chart of said scanning means and having a reference signal chart for scanning the light from said light source, said reference signal chart having fifth sections and sixth sections alternately arranged in the scanning direction so that a set of them forms the same period as said first and second portions; and photoelectrical converting means for the reference signal adapted to receive the light scanned by said reference signal chart for converting said scanned light into said electrical reference signal.

5. A device according to claim 3, wherein the phase of said second portion is opposite to that of said first portion.

6. A device according to claim 5, wherein the width of said neutral portion in the direction perpendicular to the scanning direction is slightly shorter than the length of said image.

7. A device according to claim 3, wherein said first and third sections are transparent, said second and fourth sections are opaque, and said movable chart of said scanning means is interposed between said optical system and said photoelectrical converting means.

8. A device according to claim 7, wherein said neutral portion is transparent so that said photo-electrical converting means converts said image positioned on said neutral portion into a non-periodical electrical control signal, and said drive means stops movement of at least said optical system or said object when said phase difference measuring means measures the phase difference between said electrical reference signal and said electrical non-periodical control signal to generate an output corresponding to said measured phase difference.

9. A device according to claim 3, wherein said neutral portion and said first and third sections each include transparent parts and opaque parts alternately arranged in the scanning direction so that a set of said transparent and opaque parts form a period smaller that that of said first and second portions, and said second and fourth sections are opaque, and further comprising means connected between said photoelectrical converting means and said phase difference measuring means for selecting an electrical signal having the same period as said electrical reference signal out of said electrical control signals converted by said photoelectrical converting means.

10. A device according to claim 9, wherein said selecting means is a tuning amplifier.

* * * * *